United States Patent Office 2,849,425
Patented Aug. 26, 1958

2,849,425

N-PENTAMETHYLENE TETRAHYDROBENZOTHIAZOLE-2-SULFENAMIDE ACCELERATION OF RUBBER VULCANIZATION

Glen Alliger, Akron, Ohio, assignor to The Firestone Tire & Rubber Company, Akron, Ohio, a corporation of Ohio No Drawing. Application February 13, 1956
Serial No. 564,882

2 Claims. (Cl. 260—79.5)

This invention relates to a novel chemical compound, which is a superior delayed-action accelerator of the vulcanization of rubber.

As operating temperatures have gone up in rubber processing factories during recent years, it has been generally realized that vulcanization accelerators previously considered satisfactorily delayed in action are not safe in some rubber formulations in a modern plant. Certain sulfenamide accelerators, and especially N-cyclohexyl benzothiazole-2-sulfenamide, have been very useful, but they leave something to be desired because many modern rubber stocks containing them become "scorchy" in the high speed banbury and the high speed tubing machines of a modern tire plant.

It is therefore an object of the invention to devise a new vulcanization accelerator capable of producing vulcanizates having commercially acceptable physical properties but imparting no scorching tendencies to the rubber stocks during high speed mixing and tubing operations in a rubber factory.

The invention is realized by the successful preparation and use of the new chemical compound, N-pentamethylene tetrahydrobenzothiazole-2-sulfenamide having the following structural formula:

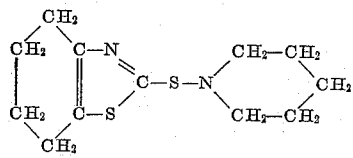

The new sulfenamide can be prepared in accordance with the following example.

Example

Alpha-chlorocyclohexanone is prepared by the method of Organic Syntheses, vol. 25, pages 22–23 (1945). To a suspension of 294 grams (3 moles) of cyclohexanone in 900 ml. of water there is added 215 grams (3.1 moles) of chlorine through a flow meter at 25 to 30° C. The resulting crude reaction product is separated, washed with water, dried over anhydrous sodium sulfate and then fractionally distilled at atmospheric pressure. Three fractions of distillate are collected, as follows:

| Boiling range, ° C. | Grams of product | Refractive index ($n_D^{20}$) |
|---|---|---|
| 1. 60–64 | 93 | 1.4816 |
| 2. 64–65 | 87 | 1.4844 |
| 3. 64–65 | 64 | 1.4849 |

The three fractions provide a total of 244 grams of the chlorocyclohexanone, a yield of 61% of theory.

The intermediate product, 2-mercaptotetrahydrobenzothiazole is prepared by dissolving each of the chlorocyclohexanone fractions, listed above, in about 300 ml. of absolute ethyl alcohol and then adding an equimolecular quantity of ammonium dithiocarbamate to the solution. The solution is then heated to about 40° C. at which temperature a condensation reaction between the two reagents sets in. The temperature of the reaction solution is kept below 60° C. The product, tetrahydrobenzothiazole-2-thiol, separates from the alcoholic reaction mixture on cooling. In each case the melting point of the product is 174 to 176° C. The yields obtained from each fraction of the alpha-chlorocyclohexanone (identified by number) are listed below.

| Alpha-chlorocyclohexanone | Ammonium dithiocarbamate | Yield Grams | Yield Percent |
|---|---|---|---|
| 1. 56 grams (0.42 mole) | 44 grams (0.42 mole) | 42 | 59 |
| 2. 66 grams (0.5 mole) | 55 grams (0.5 mole) | 46 | 54 |
| 3. 62 grams (0.47 mole) | 52 grams (0.47 mole) | 48 | 60 |

The sulfenamide of the invention is produced by treating an alkaline aqueous mixture of piperidine and 2-mercapto-tetrahydrobenzothiazole with aqueous potassium iodide-iodine reagent. To this end 42.5 grams (0.5 mole) of piperidine, 17.1 grams (0.1 mole) of the thiazole and 50 ml. of 10% aqueous sodium hydroxide are mixed and then diluted with water to 200 ml. One hundred ml. of 1.0 molar $KI_3$ solution is added slowly with stirring to the mixture. The oily reaction product is separated, washed several times with water, and then dried over anhydrous sodium sulfate. The N-pentamethylene tetrahydrobenzothiazole-2-sulfenamide (yield 22 grams, 88%) solidifies on standing. After recrystallization the product melts at 29–31° C.

The sulfenamide of the invention is tested as a delayed-action vulcanization accelerator by comparing it to commercial accelerators, 2-mercaptobenzothiazole and N-cyclohexyl benzothiazole-2-sulfenamide, in the following rubber formula:

Ingredients: Parts by weight
- Rubber (smoked sheets) _____ 100.00
- Zinc oxide _____ 5.00
- Sulfur _____ 3.00
- Stearic acid _____ 1.10
- Accelerator _____ 0.75

Samples of the three rubber compositions, so formulated are heated at 240° F. for various times to determine whether or not they possess any tendency to pre-vulcanize or set-up during processing operations prior to the usual vulcanizing step. The following data, in which modulus and tensile values are expressed as pounds per square inch (p. s. i.), are obtained.

| | Mercaptobenzothiazole | Cyclohexyl benzothiazole sulfenamide | Accelerator of this invention |
|---|---|---|---|
| 600% modulus (p. s. i.): | | | |
| 15 minutes | 275 | No cure | No cure. |
| 30 minutes | 875 | ___do___ | Do. |
| 60 minutes | 1,500 | 1,700 | Do. |
| Tensile strength at break (p. s. i.): | | | |
| 15 minutes | 1,650 | No cure | Do. |
| 30 minutes | 2,650 | ___do___ | Do. |
| 60 minutes | 3,750 | 3,100 | Do. |
| Percent elongation at break: | | | |
| 15 minutes | 900 | No cure | Do. |
| 30 minutes | 780 | ___do___ | Do. |
| 60 minutes | 730 | 720 | Do. |

The above data demonstrate the well-known scorchiness of the popular accelerator, 2-mercaptobenzothiazole and the delayed action of N-cyclohexyl benzothiazole-2-sulfenamide. The extreme delayed action of the accelerator of the invention, effecting no cure even after one hour at 240° F., is remarkable.

Other samples of the rubber compositions accelerated by the N-cyclohexyl benzothiazole sulfenamide and by the accelerator of the invention are heated at various times at the conventional vulcanizing temperature of 280° F., and the following data are obtained:

|  | Cyclohexyl benzothiazole sulfenamide | Accelerator of this invention |
|---|---|---|
| 600% modulus (p. s. i.): |  |  |
| 10 minutes | 850 | No cure. |
| 20 minutes | 2,350 | 1,775. |
| 40 minutes | 3,300 | 3,825. |
| 80 minutes | 2,825 | 3,600. |
| Tensile strength at break (p. s. i.): |  |  |
| 10 minutes | 2,175 | No cure. |
| 20 minutes | 4,000 | 3,550. |
| 40 minutes | 3,625 | 3,950. |
| 80 minutes | 3,625 | 3,650. |
| Percent elongation at break: |  |  |
| 10 minutes | 730 | No cure. |
| 20 minutes | 640 | 720. |
| 40 minutes | 620 | 610. |
| 80 minutes | 620 | 600. |

Thus, even though the novel accelerator produces excellent physical properties at 20 and 40 minute cures, it retains its good delayed-action characteristics at 280° F., whereas the popular accelerator, N-cyclohexyl benzothiazole-2-sulfenamide does not.

The accelerator of the invention is equally effective as a superior delayed-action vulcanization accelerator in rubber tire tread and tire body compounds, latex compounds or other conventional types of vulcanizable compounds of rubber, reclaimed rubber, or synthetic rubber, and it consistently imparts high modulus, tensile and abrasion-resisting properties to the vulcanized compounds. The various synthetic rubbers vulcanizable by heating with sulfur are herein considered equivalent to rubber, examples being rubbery butadiene polymers, isoprene polymers and the various known rubbery copolymers or interpolymers of conjugated diolefins and ethylenic monomers, including GR-S (copolymer of butadiene and styrene) and GR-A (copolymer of butadiene and acrylonitrile). Although sulfur is the usual vulcanizing agent employed with the present accelerator, the various known sulfur-bearing vulcanizing agents, e. g., the alkylphenol polysulfides, amine polysulfides and the thiuram disulfides, can be substituted for a part or all of the free sulfur normally employed with the accelerator.

Conventional accelerator activators, such as amines, amine salts and other basic compounds, can be added to a rubber stock containing the new accelerator if more rapid curing is desired. Also the novel accelerator can be used in combination with other accelerators, such as a guanidine (e. g., diphenyl guanidine) or a conventional mercaptothiazole derivative (e. g., mercaptobenzothiazole or 2,2'-dithio-bis-benzothiazole), in order to produce rubber compositions possessing especially rapid or specific vulcanizing properties. The novel accelerator is effective when used in other proportions than the proportion shown above, and it is normally utilized in the range of 0.1 to 10 parts per 100 parts of rubber. Other curing times and temperatures than those shown above are operative, as is well understood by those skilled in the art; for instance, a rubber composition requiring an hour or more to vulcanize at about 260° F. is vulcanized in less than one minute at 400° F. Other proportions of sulfur, or equivalent curing agent, than the proportion shown above are effective in combination with the new accelerator, as is well understood by a skilled rubber compounder.

What is claimed is:

1. Method of vulcanizing a sulfur-vulcanizable rubbery substance of the group consisting of natural rubber and synthetic rubbery conjugated diolefin hydrocarbon polymers comprising heating to a vulcanizing temperature the rubbery substance and sulfur in the presence of 0.1 to 10 parts per 100 parts of rubbery substance of N-pentamethylene tetrahydrobenzothiazole-2-sulfenamide.

2. A vulcanizable composition comprising a sulfur-vulcanizable rubbery substance of the group consisting of natural rubber and synthetic rubbery conjugated diolefin hydrocarbon polymers, sulfur and 0.1 to 10 parts per 100 parts of rubbery substance of N-pentamethylene tetrahydrobenzothiazole-2-sulfenamide.

References Cited in the file of this patent

UNITED STATES PATENTS

| 1,926,739 | Clapson et al. | Sept. 12, 1933 |
| 1,942,790 | Zaucker et al. | Jan. 9, 1934 |
| 2,474,237 | Eby | June 28, 1949 |
| 2,514,208 | Smith | July 4, 1950 |
| 2,768,988 | Christensen | Jan. 2, 1952 |

UNITED STATES PATENT OFFICE
CERTIFICATE OF CORRECTION

Patent No. 2,849,425 August 26, 1958

Glen Alliger

It is hereby certified that error appears in the printed specification of the above numbered patent requiring correction and that the said Letters Patent should read as corrected below.

Column 3, line 16, in the table, second column, second line under the heading, for "2,350" read -- 3,350 --; column 4, line 48, list of references cited, under the heading "UNITED STATES PATENTS", for "Jan. 2, 1952" read -- Oct. 30, 1956 --.

Signed and sealed this 28th day of July 1959.

(SEAL)

Attest:

KARL H. AXLINE
Attesting Officer

ROBERT C. WATSON
Commissioner of Patents